United States Patent [19]

Cabral et al.

[11] Patent Number: 5,455,599
[45] Date of Patent: Oct. 3, 1995

[54] OBJECT-ORIENTED GRAPHIC SYSTEM

[75] Inventors: Arthur W. Cabral; Rajiv Jain, both of Sunnyvale; Maire L. Howard, San Jose; John Peterson, Menlo Park; Richard D. Webb, Sunnyvale; Robert Seidl, Palo Alto, all of Calif.

[73] Assignee: Taligent Inc., Cupertino, Calif.

[21] Appl. No.: 416,949

[22] Filed: Apr. 4, 1995

Related U.S. Application Data

[63] Continuation of Ser. No. 145,840, Nov. 2, 1993, abandoned.

[51] Int. Cl.$^6$ .................................................... G09G 5/00
[52] U.S. Cl. .......................................... 345/133; 395/118
[58] Field of Search ....................... 345/112, 132, 345/133, 153, 154, 155; 395/118, 275

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1992 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,241,625 | 8/1993 | Epard et al. | 395/163 |
| 5,265,206 | 11/1993 | Shackelford et al. | 395/200 |
| 5,297,279 | 3/1994 | Bannon et al. | 395/600 |

FOREIGN PATENT DOCUMENTS

| | | |
|---|---|---|
| 0459683 | 12/1991 | European Pat. Off. . |
| 0603095 | 6/1994 | European Pat. Off. . |
| 91/20032 | 12/1991 | WIPO . |

OTHER PUBLICATIONS

"Object Oriented Approach to Design of Interactive Intelligent Instrumentation User Interface", Nikola Bogunovic, Automatika vol. 34, No. 3–4, May–Dec. 1993, pp. 143–146.

"Object–oriented versus bit–mapped graphics interfaces: performance and preference differences for typical applications", Michael Mohageg, Behaviour & Inforamtion Technology, vol. 10, No. 2, Mar.–Apr. 1991 pp. 121–147.

"Porting Apple© Macintosh© Applications to the Microsoft© Windows Environment", Schulman et al., Microsoft System Journal, vol. 4, No. 1, Jan. 1989, pp. 11–40.

Computer, vol. 22(10), Dec. 1989, Long Beach, US, pp. 43–54, Goodman "Knowledge–Based Computer Vision".

Software–Practice and Experience, vol. 19(10), Oct. 1989, Chicester UK, pp. 979–1013, Dietrich, "TGMS: An Object–Oriented System for Programming Geometry".

Proceedings of the SPIE, vol. 1659, Feb. 12, 1992, US, pp. 159–167, Haralick et al. "The Image Understanding Environment".

Intelligent CAD Oct. 6, 1987, NL, pp. 159–168, Woodbury et al., "An Approach to Geometric Reasoning".

Computer, vol. 22(10), Dec. 1989.

*Primary Examiner*—Jeffery Brier
*Attorney, Agent, or Firm*—Keith Stephens

[57] ABSTRACT

An object-oriented graphic system is disclosed including a processor with an attached display, storage and object-oriented operating system. The graphic system builds a component object in the storage of the processor for managing graphic processing. The processor includes an object for connecting one or more graphic devices to various objects responsible for tasks such as graphic accelerators, frame buffers, page description languages and vector engines. The system is fully extensible and includes polymorphic processing built into each of the support objects.

26 Claims, 16 Drawing Sheets

THouse    TArrow    TGraphicFolder

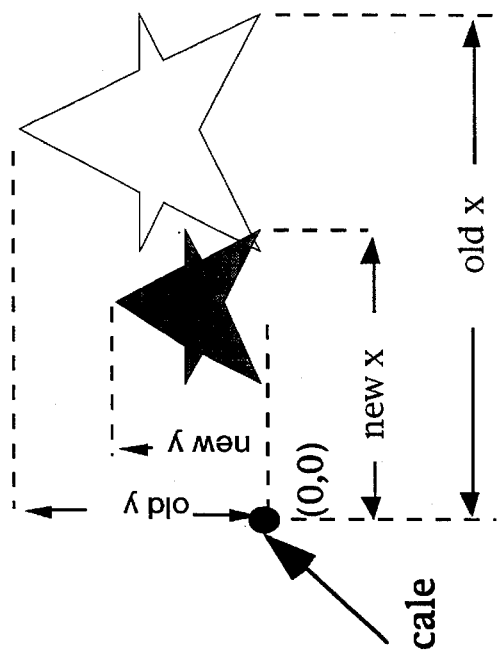
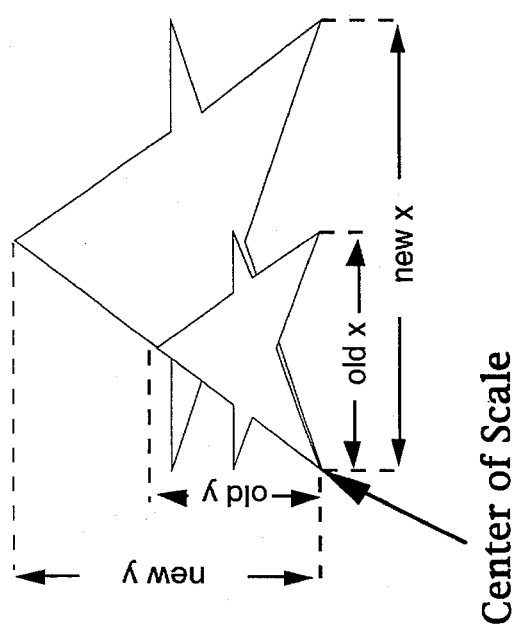
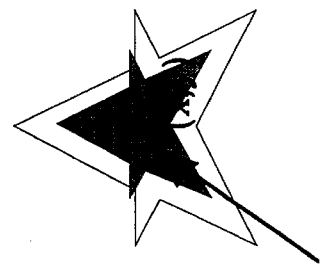
FIGURE 9A
FIGURE 9B

OBJECT-ORIENTED GRAPHIC SYSTEM

This is a continuation, of application Ser. No. 08/145,840, filed Nov. 2, 1993, abandoned.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

This invention generally relates to improvements in computer systems and more particularly to a system for enabling graphic applications using an object-oriented operating system.

2. Background of the Invention

Computer pictures or images drawn on a computer screen are called computer graphics. Computer graphic systems store graphics internally in digital form. The picture is broken up into tiny picture elements or pixels. Thus, a computer picture or graphic is actually an aggregation of individual picture elements or pixels. Internally, in the digital world of the computer, each pixel is assigned a set of digital values which represent the pixel's attributes. A pixel's attributes may describe its color, intensity and location, for example. Thus to change the color, intensity or location of a pixel, one simply changes the digital value for that particular attribute.

Conventional computer graphic systems utilize primitives known as images, bitmaps or pixel maps to represent computer imagery as an aggregation of pixels. These primitives represent a Two Dimensional (2D) array of pixel attributes and their respective digital values. Typically, such a primitive is expressed as a "struct" (data structure) that contains a pointer to pixel data, a pixel size, scanline size, bounds, and possibly a reference to a color table. Quite often, the pixels are assumed to represent Red, Green, and Blue (RGB) color, luminance, or indices into a color table. Thus, the primitive serves double duty as a framebuffer and as a frame storage specification.

The burgeoning computer graphics industry has settled on a defacto standard for pixel representation. All forms of images that do not fit into this standard are forced into second class citizenship. Conventional graphics systems, however, are nonextendable. They are usually dedicated to a particular application operating on a specific class of images. This is unacceptable in today's rapidly changing environment of digital technology. Every day a new application, and with it the need to process and manipulate new image types in new ways. Thus, the use of a graphics system with a nonextensible graphic specification is not only short sighted, it is in a word, obsolete. Graphical applications, attributes, and organizational requirements for computer output media are diverse and expanding. Thus, dedicated, single-purpose graphic systems fail to meet current application requirements. There is a need for a robust, graphic system that provides a dynamic environment and an extensible graphic specification that can expand to include new applications, new image types and provide for new pixel manipulations.

For example, two applications rarely require the same set of pixel attributes. Three Dimensional (3D) applications store z values (depth ordering), while animation and paint systems store alpha values. Interactive material editors and 3D paint programs store 3D shading information, while video production systems may require YUV 4:2:2 pixel arrays. Hardware clippers store layer tags, and sophisticated systems may store object IDs for hit detection. Moreover, graphical attributes such as color spaces are amassing constant additions, such as PhotoYCC™. Color matching technology is still evolving and it is yet unclear which quantized color space is best for recording the visible spectrum as pixels. Thus, there are a variety of data types in the graphics world. There are also a variety of storage organization techniques. To make matters even worse, it seems that every new application requires a different organization for the pixel memory. For example, Component Interleaved or "Chunky" scanline orientations are the prevailing organization in Macintosh® video cards, but Component Interleaved banked switched memory is the trend in video cards targeted for hosts with small address spaces. Component planar tiles and component interleaved tiles are the trend in prepress and electronic paint applications, but output and input devices which print or scan in multiple passes prefer a component planar format. Multiresolution or pyramid formats are common for static images that require real-time resampling. Moreover, images that consume large amounts of memory may be represented as compressed pixel data which can be encoded in a multitude of ways.

The variety and growth of graphic applications, data types and pixel memory manipulations is very large. There is a requirement for a multipurpose system that can handle all the known applications and expand to handle those applications that are yet unknown. A single solution is impractical. Although it may handle every known requirement, it would be huge and unwieldy. However, if such an application is downsized, it can no longer handle every application. Thus, there is a need for a general graphic framework that suits the needs of many users, but allows the individual user to customize the general purpose graphic framework.

SUMMARY OF THE INVENTION

An object-oriented system is well suited to address the shortcomings of traditional graphic applications. Object-oriented designs can provide a general purpose framework that suits the needs of many users, but allows the individual user to customize and add to the general purpose framework to address a particular set of requirements. In general, an object may be characterized by a number of operations and a state which remembers the effect of these operations.

Thus it is a goal of the present invention to provide a method and apparatus which facilitates an object-oriented graphic system. A processor with an attached display, storage and object-oriented operating system builds a component object in the storage of the processor for managing graphic processing. The processor includes an object for connecting one or more graphic devices to various objects responsible for tasks such as graphic accelerators, frame buffers, page description languages and vector engines. The system is fully extensible and includes polymorphic processing built into each of the support objects.

BRIEF DESCRIPTION OF THE DRAWINGS

FIG. 9 illustrates scaling a star about different centers of scale in accordance with a preferred embodiment;

DETAILED DESCRIPTION OF THE INVENTION

Figure 1A:
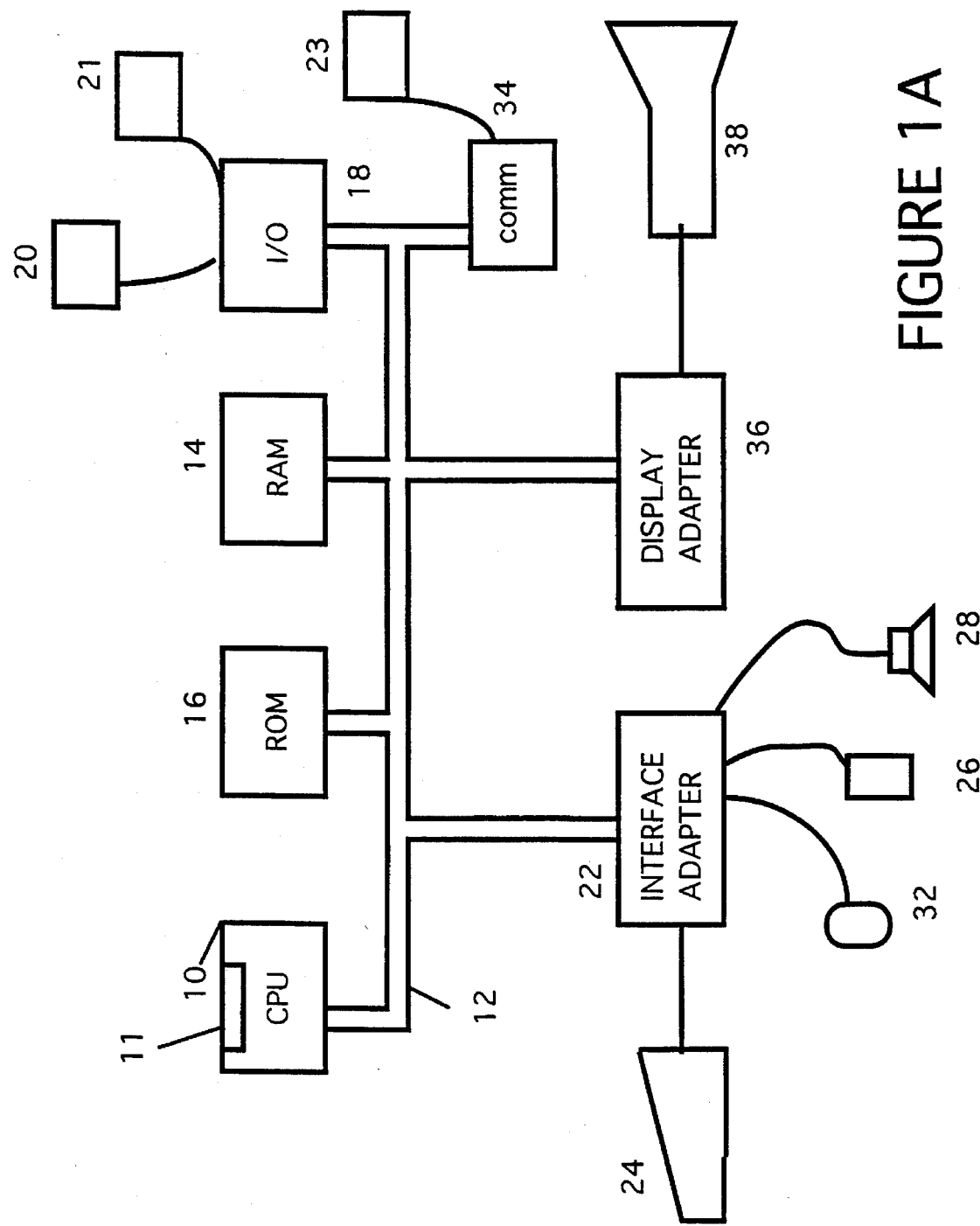
FIG. 1A is a block diagram of a personal computer system in accordance with a preferred embodiment.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7® operating system.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and determines, according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower, non-object layers with procedural Operating System (OS) calls.

Another aspect of object oriented programming is a framework approach to application development. One of the most rational definitions of frameworks came from Ralph E. Johnson of the University of Illinois and Vincent F. Russo of Purdue. In their 1991 paper, Reusing Object-Oriented Designs, University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks, have a strategic asset implication for those organizations who have acquired expertise in vertical markets such as manufacturing, accounting, or bio-technology, and provide a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework. Types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NeXT), and Smalltalk-80 MVC (ParcPlace).

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls-the developer's program makes the calls when it needs the service and control returns when the service has been provided. The program structure is based on the flow-of-control, which is embodied in the code the developer writes. When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create customized solutions. For example, consider a multimedia framework which could provide the foundation for supporting new and diverse devices such as audio, video, MIDI, animation, etc. The developer that needed to support a new kind of device would have to write a device driver. To do this with a framework, the developer only needs to supply the characteristics and behaviors that are specific to that new device.

The developer in this case supplies an implementation for certain member functions that will be called by the multimedia framework. An immediate benefit to the developer is that the generic code needed for each category of device is already provided by the multimedia framework. This means less code for the device driver developer to write, test, and debug. Another example of using system frameworks would be to have separate I/O frameworks for SCSI devices, NuBus cards, and graphics devices. Because there is inherited functionality, each framework provides support for common functionality found in its device category. Other developers could then depend on these consistent interfaces for implementing other kinds of devices.

A preferred embodiment takes the concept of frameworks and applies it throughout the entire system. For the commercial or corporate developer, systems integrator, or OEM, this means all the advantages that have been illustrated for a framework such as MacApp can be leveraged not only at the application level for such things as text and user interfaces, but also at the system level, for services such as graphics, multimedia, file systems, I/O, testing, etc. Application creation in the architecture of a preferred embodiment will essentially be like writing domain-specific pieces that adhere to the framework protocol. In this manner, the whole concept of programming changes. Instead of writing line after line of code that calls multiple API hierarchies, software will be developed by deriving classes from the preexisting frameworks within this environment, and then adding new behavior and/or overriding inherited behavior as desired. Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the piece the developer plugs in will be small. In other cases, the developer may make very extensive modifications and create something completely new.

In a preferred embodiment, as shown in FIG. 1, a multimedia data routing system manages the movement of multimedia information through the computer system, while multiple media components resident in the RAM 14, and under the control of the CPU 10, or externally attached via the bus 12 or communication adapter 34, are responsible for presenting multimedia information. No central player is necessary to coordinate or manage the overall processing of the system. This architecture provides flexibility and provides for increased extensibility as new media types are added. A preferred embodiment provides an object-oriented graphic system. The object-oriented operating system comprises a number of objects that are clearly delimited parts or functions of the system. Each object contains information about itself and a set of operations that it can perform on its information or information passed to it. For example, an object could be named WOMAN. The information contained in the object WOMAN, or its attributes, might be age, address, and occupation. These attributes describe the object WOMAN. The object also contains a set of operations that it can perform on the information it contains. Thus, WOMAN might be able to perform an operation to change occupations from a doctor to a lawyer.

Objects interact by sending messages to each other. These messages stimulate the receiving object to take some action, that is, perform one or more operations. In the present invention there are many communicating objects. Some of the objects have common characteristics and are grouped together into a class. A class is a template that enables the creation of new objects that contain the same information and operations as other members of the same class. An object created from a certain class is called an instance of that class. The class defines the operations and information initially contained in an instance, while the current state of the instance is defined by the operations performed on the instance. Thus, while all instances of a given class are created equal, subsequent operations can make each instance a unique object.

Polymorphism refers to object-oriented processing in which a sender of a stimulus or message is not required to know the receiving instance's class. The sender need only know that the receiver can perform a certain operation, without regard to which object performs the operation or what class to which it belongs. Instances inherit the attributes of their class. Thus, by modifying the attribute of a parent class, the attributes of the various instances are modified as well, and the changes are inherited by the subclasses. New classes can be created by describing modifications to existing classes. The new class inherits the attributes of its class and the user can add anything which is unique to the new class. Thus, one can define a class by simply stating how the new class or object differs from its parent class or object. Classes that fall below another class in the inheritance hierarchy are called descendants or children of the parent class from which they descend and inherit. In this polymorphic environment, the receiving object is responsible for determining which operation to perform upon receiving a stimulus message. An operation is a function or transformation that may be applied to or by objects in a class. The stimulating object needs to know very little about the receiving object which simplifies execution of operations. Each object need only know how to perform its own operations, and the appropriate call for performing those operations a particular object cannot perform.

When the same operation may apply to many different classes, it is a polymorphic operation. The same operation takes on a different form in a variety of different classes. A method is the implementation of a particular operation for a given class. For example, the class Document may contain an operation called Read. Depending on the data type of the document, for example, ASCII versus BINARY, a different method might be used to perform the Read operation. Thus while both methods logically perform the same task, Read, and are thus called by the same name, Read, they may in fact be different methods implemented by a different piece of executable code. While the operation Read may have methods in several classes, it maintains the same number and types of arguments, that is, its signature remains the same. Subclasses allow a user to tailor the general purpose framework. It allows for different quantization tradeoffs, sets of pixel attributes, and different pixel memory organizations. Each subclass can encapsulate the knowledge of how to allocate, manage, stream, translate, and modify its own class of pixel data. All subsystems of a preferred embodiment use polymorphic access mechanisms, which enable a user to extend buffer types that can be rendered to or copied.

Fortunately, some commonalty exists among the various types of buffers. As it turns out, there are eight basic functions or categories that are necessary to satisfy the majority of client needs. Most clients want polymorphic management and the ability to specify the relationship between discrete and continuous space. Clients want to characterize color capabilities for use in accurate color reproduction. Clients want mechanisms for pixel memory alteration in the form of Get and SetPixel, specialized "blit loops" tailored for scan converting clients, BitBit, and CopyImage. Clients want mechanisms to supply clients with variants which match a key formed from the combination of client supplied attributes. Clients desire the ability to perform polymorphic queries regarding traits or stored attributes. Clients require mechanisms allowing clients to polymorphically create, maintain, and query buffer caches. And finally, clients require mechanisms which allow them to polymorphically create, and maintain correlated backbuffers.

Graphic Application Programming Interface (API)

The basic components of a graphic system include a fixed set of Geometric Primitives: Point, Rectangle, Line, Curve, Polygon, Polyline, Area in 2D, Line, Polyline, Curve and Surface in 3D. This set of geometry is not intend to be user extensible. This limits the complexity of the lower level graphic devices, and provides a "contract" between the user-level API and the low level device for consistent data. Discretized data sets: which include 2D raster images with a number of possible components and triangulated 3D datasets. High level modeling tools: that can express hierarchical groups of graphic objects. Transforms: these objects represent the operations available with a traditional 3×3 (in 2D) or 4×4 (in 3D) matrices to rotate, scale, translate, etc. objects. Bundles: these objects encapsulate the appearance of the geometry. Standard attributes include (2D & 3D) frame and/or fill color, pen thickness, dash patterns, etc. In 3D, bundles also define shading attributes. Custom attributes may be specified via a keyword/value pair. All numeric values are expressed in IEEE standard double precision floating point in the graphic system. Graphic Ports: a graphic port is an application-level view that encapsulates the state of the application. The graphic port re-routes any draw calls to an appropriate one of a number of possible devices (monitors, off screen frame buffers, PostScriptPrinter on a network, a window, etc.). Graphical "state" (current transform, bundle, clipping region, etc) is managed at the port level. However, at the device level the system is "stateless". In other words, the complete state for a particular rendering operation is presented to the device when that rendering occurs. Note that a device may turn around and invoke other devices. For example, a device for the entire desktop may first decide which screen the geometry falls on, and then invoke the render call for that particular screen.

Architectural Introduction

In past graphics architectures, a graphic typically stores its state (such as color, transfer mode, clip area, etc.) privately. When asked to draw, the graphic procedurally copies these state variables into a graphic port, where they are accessed by the rendering code. Thus, the graphic's state is available only during this explicit drawing operation. This is not object-oriented, and is a restriction a modern graphic system cannot afford to make. A preferred embodiment provides a framework for a graphic to store its state. The framework supports a "don't call us, we'll call you" architecture in which clients can get access to the graphic state outside the context of any particular function. This is the purpose of the graphic port class. It is an abstract class that defines the interface for accessing the state variables. Concrete subclasses define the actual storage and concatenation behavior of the state variables.

Graphic Port Class

Figure 1B:
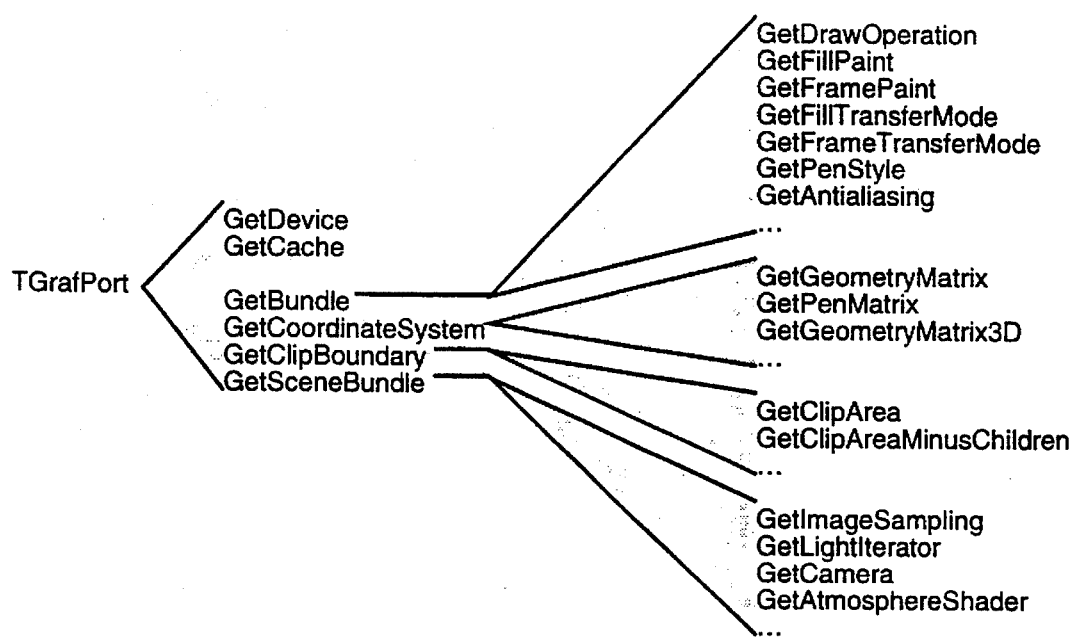
FIG. 1B is a hierarchical layout of a graphic port in accordance with a preferred embodiment.

A design employing graphic port classes groups the graphic states into four different groups, which then are grouped into a single class called graphic port. The four "sub-states" are TGrafBundle, TCoordinateSystem, TClipBoundary, and TSceneBundle. A graphic port object can be referenced by other classes that need access to the full graphic state. Additionally, a child's graphic state can be concatenated to its parent's graphic port object, producing a new graphic port object. FIG. 1B is a hierarchical layout of a graphic port in accordance with a preferred embodiment. A graphic port class also contains methods to access a device and a device cache. GetDevice returns a pointer to the device to which rendering is done. Typically, this device is inherited from the parent graphic port. GetCache returns a pointer to the cache used by the device to cache devicedependent objects. This cache must have been created by the device at an earlier time. The main purpose for subclassing graphic port and the four sub-states is to define how storage and concatenation of the graphic state, device, and device cache is done. A simpler, flat group of state variables would not be flexible enough to support customization of state concatenation for a subset of the state variables. Also, the sub-states assist in splitting the state variables into commonly used groups. For instance, a simple graphic typically needs only a TGrafBundle; more complex graphic objects may need a matrix and possibly a clip area.

A graphic class, such as MGraphic, must describe itself to a TGrafPortDevice in terms of the basic set of geometries, and each geometry must have a graphic port object associated with the geometry. The graphic port allows a graphic object to conveniently "dump" its contents into a TGrafDevice object. This is accomplished by supplying a set of draw functions in the graphic port class that mirrors a set of render functions in the TGrafDevice class. Each draw function takes a geometry and passes the geometry and the contained graphic state to the appropriate render call in the device. For convenience, an overriding bundle and model matrix are also passed.

Figure 2:
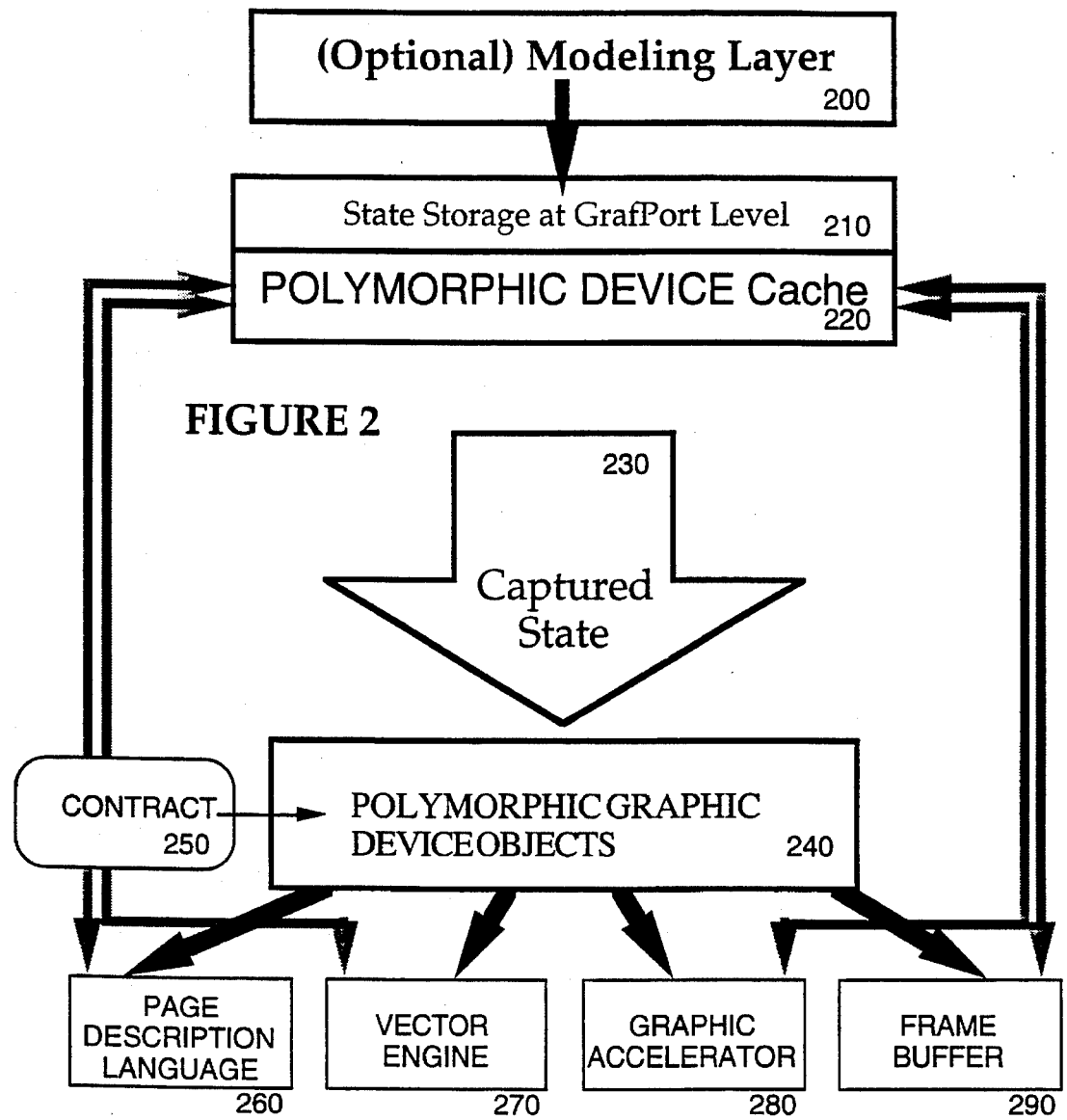
FIG. 2 is a block diagram of the architecture in accordance with a preferred embodiment.

FIG. 2 is a block diagram of the architecture in accordance with a preferred embodiment. In the preferred embodiment, a modeling layer 200 generates calls to a Graphic port 210 using the API 210 described above. This GraphPort interface accepts only a specific, fixed set of primitives forming a "contract" 250 between the user level API and the device level API 240. The graphic port captures state information including transform, appearance ("bundle"), and clipping into a polymorphic cache 220 that is used across multiple types of devices. For each render call, the geometry and all relevant accumulated state information 230 is presented to the device via a polymorphic graphic device object 240. A device managed by the graphic device object 240 may take the form of a page description language 260 (such as postscript), a vector plotting device 270, a device with custom electronic hardware for rendering geometric primitives 280, a traditional framebuffer 290, or any other graphic device such as a display, printer or plotter.

Modeling Layer

Above the graphic port and geometry layers there is an optional modeling layer. A preferred embodiment provides a modeling layer, but an application can override the default. The default modeling layer is called a "MGraphic" layer. An MGraphic object encapsulates both geometry and appearance (a bundle). To render an MGraphic, a draw method is used. This method takes the graphic port the MGraphic is drawn into as an argument. The MGraphic draw method turns this information into a graphic port call. The goal behind separating the MGraphic layer from-the graphic port / geometry layer is to avoid a rigid structure suited to only one type of database. If the structure provided by the MGraphic objects does not satisfy the client's requirements, the architecture still permits a different data structure to be used, as long as it can be expressed in terms of primitive geometries, bundles, and transforms.

MGRAPHIC LAYER

The graphic system provides two distinct ways of rendering geometries on a device. An application can draw the geometry directly to the device. The class graphic port supports a well defined, but fixed set of 2D geometries. It supports these by a set of overloaded draw methods. When using this approach, attributes and transformation matrices are not associated with geometry, making it suitable for immediate mode rendering only. The following pseudo code is an example of how an application may use this approach to create a red line.

```
{
    create a displayPort an instance of TGrafPort
    TGLine line( TGPoint( 0.0, 0.0 , TGPoint( 1.0, 1.0 ));        //Creates a line
    TGrafBundle redColor( TRGBColor( 1.0, 0.0, 0.0 ));            //Creates a red color bundle
    displayPort->Draw(line, redColor);                            //Render the line on to the GrafPort
}
```

Figure 3:
FIG. 3 illustrates examples of graphic extensions of MGraphic in accordance with a preferred embodiment.
Figure 3:
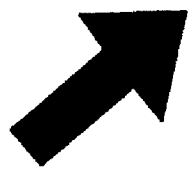
Figure 3:

Alternatively, an application can draw the geometry via a higher level abstraction called MGraphic. This is a retained mode approach to rendering of graphical primitives. MGraphic is an abstract base class for representing the 2D primitives of the graphic system. It is a higher level manifestation of graphical objects which can be held in a collection, be transformed and rendered to a graphic device (TGrafDevice). Each MGraphic object holds a set of its own attributes and provides streaming capability (with some restrictions on some of its subclasses). Hit testing methods provide a mechanism for direct manipulation of MGraphic objects such as picking. MGraphic provides extensibility through subclassing that is one of the key features of MGraphics. A particular subclass of MGraphic also creates hierarchies of MGraphic objects and provides the capability to extend the graphic system. FIG. 3 illustrates some examples of graphic extensions of MGraphic in accordance with a preferred embodiment.

Figure 4:
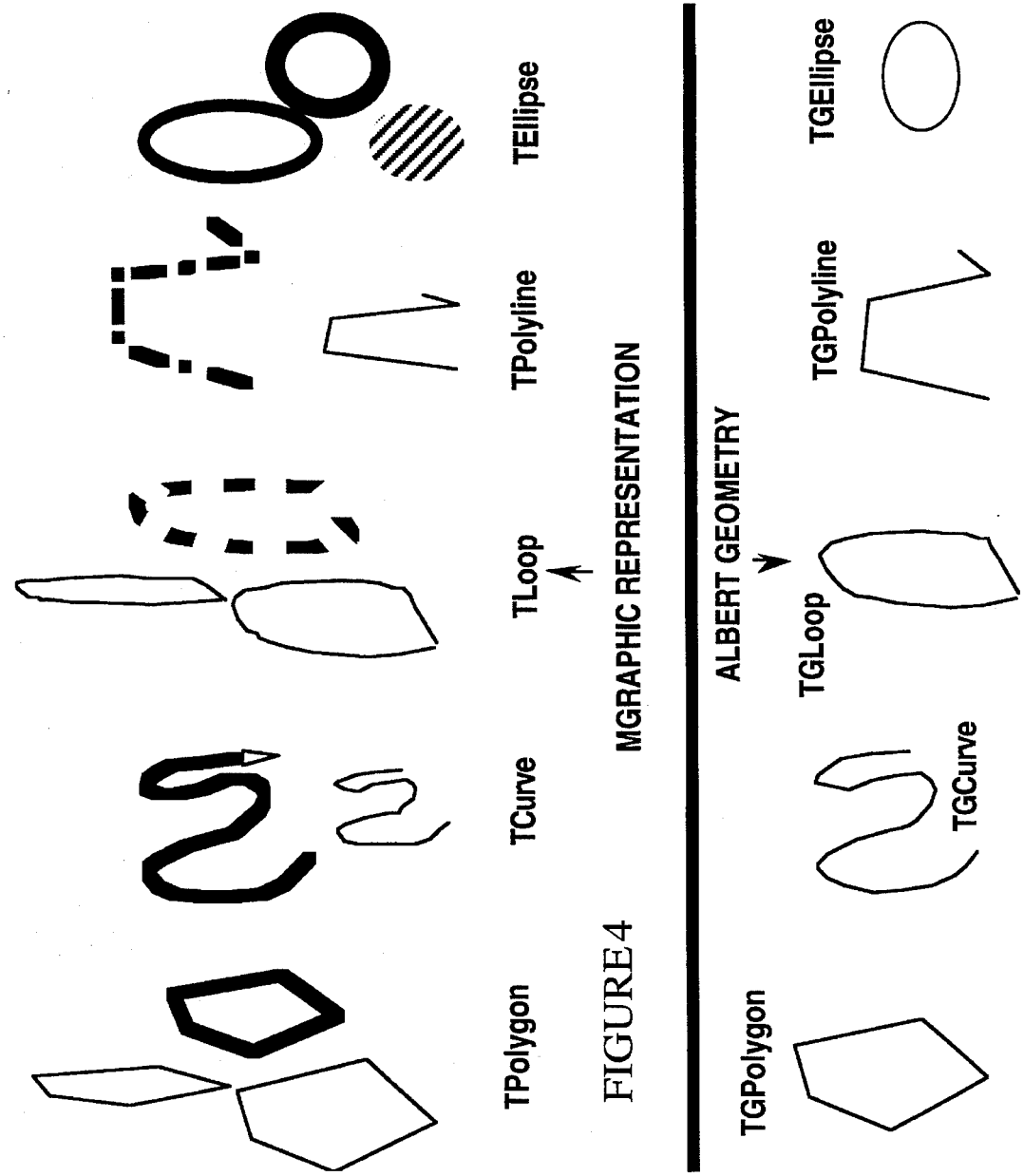
FIG. 4 illustrates MGraphics and their corresponding geometries in accordance with a preferred embodiment.
Figure 5:
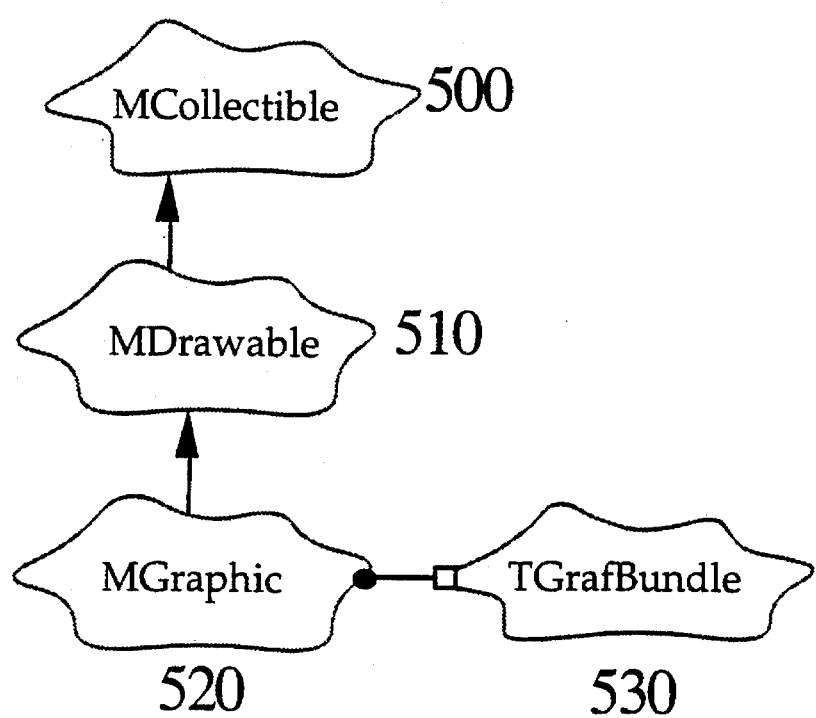
FIG. 5 is a booch diagram setting forth the flow of control of the graphic system in accordance with a preferred embodiment.

MGraphic is a utility class for applications to hold geometry related data that includes geometry definition, grafbundle (set of graphical attributes defining the representation of the geometry) and a set of transformation methods. MGraphic objects also hold any other information required by a user and will copy and stream this user specific data to an application. This class may not be needed for applications interested in pure immediate mode rendering. For immediate mode rendering of the primitives the applications render geometry by passing an appropriate geometry object, a grafbundle and a transformation matrix to the graphic port. FIG. 4 illustrates MGraphics and their corresponding geometries in accordance with a preferred embodiment. FIG. 5 is a Booch diagram setting forth the flow of control of the graphic system in accordance with a preferred embodiment. In the Booch diagram of FIG. 5, "clouds" depicted with dashed lines indicate classes or aggregations of classes (e.g. application 500). Arrows connecting classes are directed from subclass to superclass and indicate a hierarchy including the properties of encapsulation, inheritance and polymorphism as is well understood in object technology and graphic notations accepted in the art which are illustrative thereof. Double lines indicate use of the class in the implementation or interface. A circle at one end of a line segment indicates containment or use in the class with the circle on the end of the line segment. For a more complete description of this notation, reference can be made to "Object Oriented Design" by Grady Booch, published by the Benjamin/Cummings Publishing Co., Copyright 1991. The current MGraphic 520 inherits from MDrawable 510 which inherits from MCollectible 500 to inherit the streaming, versioning and other behaviors of MCollectible 500. Each MGraphic 520 also has a bundle, TGrafBundle 530, which holds a set of attributes. These attributes are used by the MGraphic at rendering time.

The MGraphic abstract base class represents only 2D graphical primitives. In general it has been observed that 2D and 3D primitives do not belong to a common set unless users clear the 3D plane on which 2D primitives lie. 2D and 3D primitives have different coordinate systems and mixing them would confuse users. Clients can mix the two sets based upon their specific application requirements. The class MDrawable 510 is the abstract base class common to both MGraphic 520 and MGraphic3D abstracting the common drawing behavior of the two classes. This class is useful for clients interested only in the draw method and do not require overloaded functionality for both 2D and 3D.

MDrawable Drawing Protocol

All MGraphics (2D and 3D) draw onto the graphic port which is passed to the MGraphic as a parameter. Besides the state information, which is encapsulated by the GrafPort, all other information is contained in the MGraphic object. This information includes the geometry, attribute bundle and any transformation information. All MGraphics draw synchronously and do not handle updating or animating requirements. It is up to the client to create subclasses. When drawing 2D and 3D primitives as a collection, such as in a list of MDrawable objects, the drawing sequence is the same as it would be when 2D and 3D draw calls are made on the graphic port. Thus, drawing a 2D polygon, a 3D box and a 2D ellipse will render differently depending upon the order in which they are rendered. The graphic port passed to this method is a passive iterator which is acted upon by the MGraphic to which it is passed.

MGraphic Transformations

Figure 6:
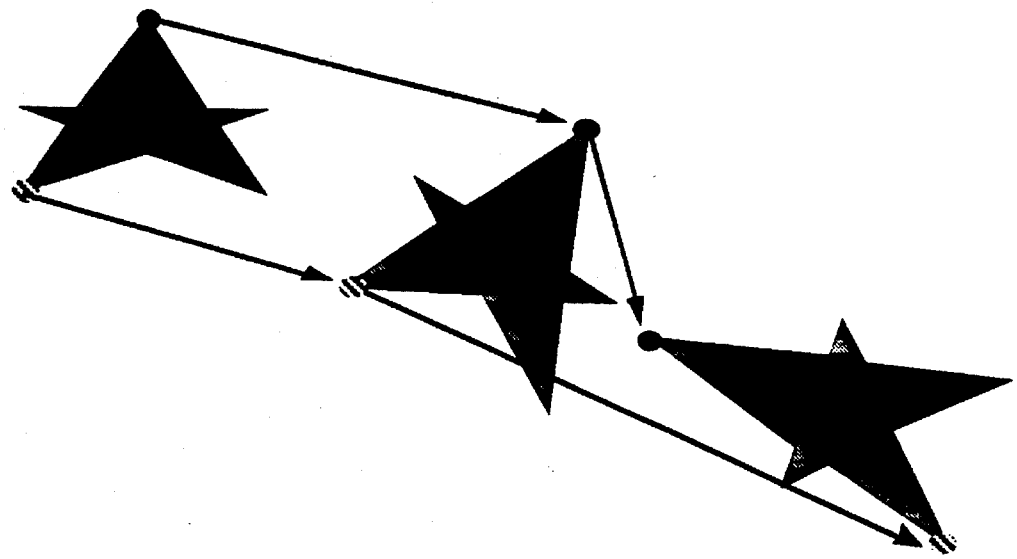
FIG. 6 illustrates a star graphic object undergoing various transformations in accordance with a preferred embodiment.

FIG. 6 illustrates a star undergoing various transformations in accordance with a preferred embodiment. Transformations can alter an MGraphic's shape, by scaling or perspective transformation, and position, by rotating and moving. The transformation methods allow applications to change an existing MGraphic's shape and location without having to recreate the MGraphic. All transformation methods apply only relative transformation to the MGraphic. Methods ScaleBy, MoveBy and RotateBy are special cases of the more general method TransformBy. Subclasses apply the transform directly to the geometry they own to directly change the geometry.

All MGraphic subclasses are closed to arbitrary transformations i.e. a TGPolygon when transformed by an arbitrary transformation will still be a TGPolygon. However, certain geometries do not possess this closure property. For example, a rectangle, when transformed by a perspective matrix, is no longer a rectangle and has no definition for either width or height. The original specification of the rectangle is insufficient to describe the transformed version of the rectangle. All MGraphic subclasses must be closed to arbitrary transformations. Since all transformations are relative, a transformed MGraphic cannot be "untransformed" by passing an identity matrix to the MGraphic method TransformBy().

Figure 7:
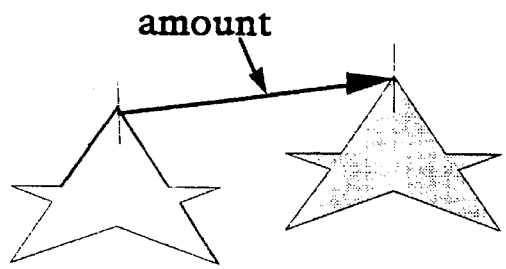
FIG. 7 depicts a star moved by an amount in accordance with a preferred embodiment.
Figure 8:
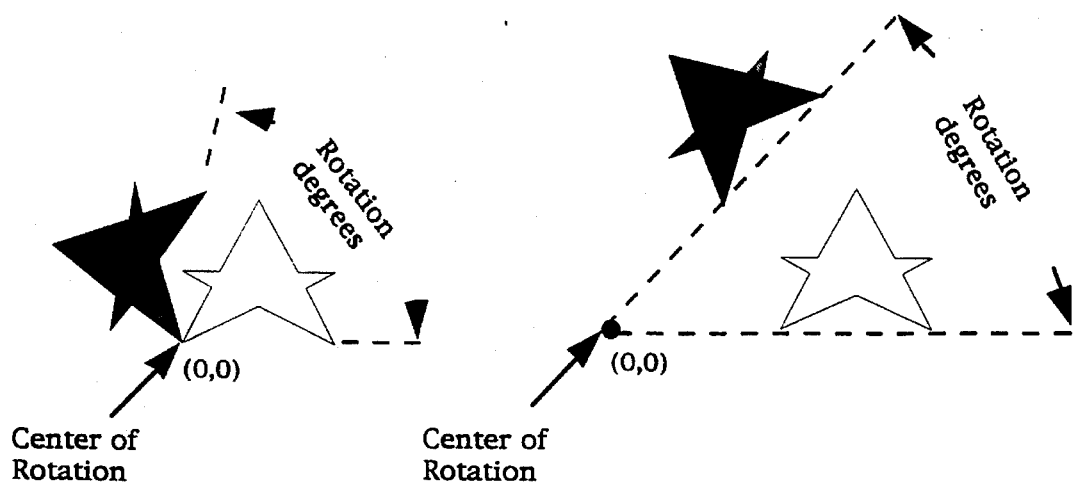
FIG. 8 illustrates rotating the star about various centers of rotation in accordance with a preferred embodiment.
Figure 8:
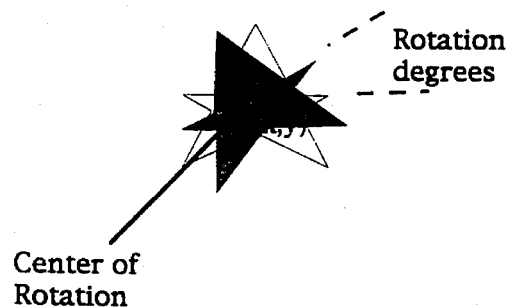

FIG. 7 depicts a star moved by an amount in accordance with a preferred embodiment. This method moves the MGraphic by an amount relative to its current position. FIG. 8 illustrates rotating the star about various centers of rotation in accordance with a preferred embodiment. The amount of rotation is specified in degrees and is always clockwise. However, subclasses can override the default and optimize for a specific geometry and usage. FIG. 9 illustrates scaling a star about different centers of scale in accordance with a preferred embodiment. The factor is a vector which allows non-uniform scaling namely in X and Y. In FIG. 9 the X coordinate of the parameter amount will be (new x/old x) and the Y coordinate will be (new y/old y). In case of uniform scaling both the X and the Y coordinate will be the same. FIG. 9 also shows scaling about different centers of scale.

Figure 10:
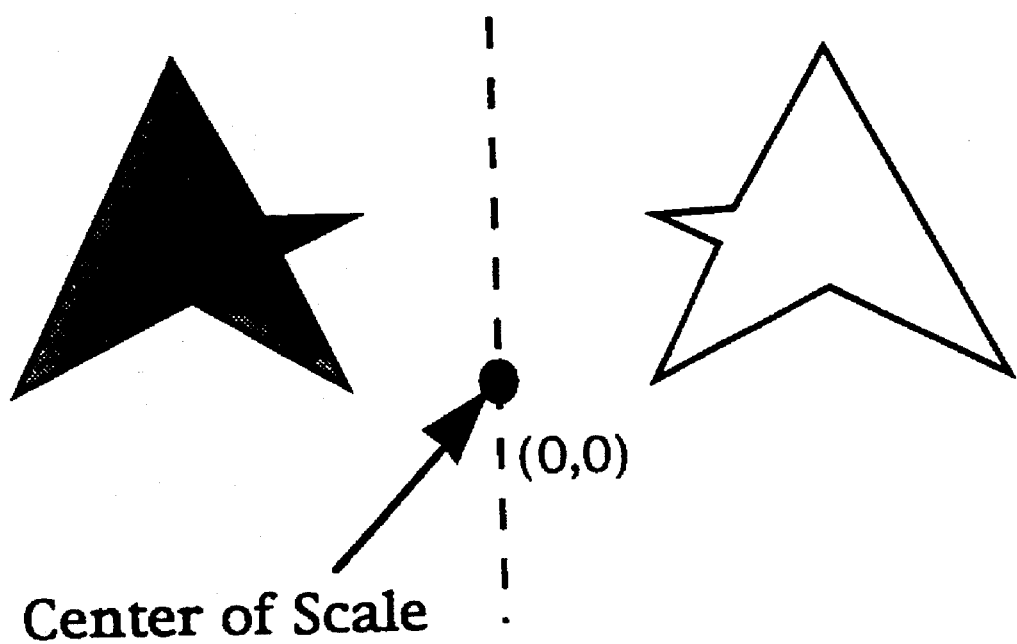
FIG. 10 shows the effects of scaling an asymmetric star by (−1.0, 1.0) in accordance with a preferred embodiment.

Negative scale factors are allowed, and the effects of negative scale factors is the same as mirroring. Scaling by −1.0 in the X direction is the same as mirroring about the Y axis while a negative scale factor in the Y direction is the same as mirroring about the X axis. FIG. 10 shows the effects of scaling an asymmetric star by (−1.0, 1.0) in accordance with a preferred embodiment. Like RotateBy() and TranslateBy(), the effect of this transform is the same as creating a scaling matrix and passing it to TransformBy() and this is the default implementation. Subclasses can override this default implementation and optimize for a specific geometry and usage. TransformBy is a pure virtual member function that transforms the MGraphic by matrix. All concrete subclasses of MGraphics must define this member function. Subclasses that own a TGrafMatrix for manipulation must post multiply the parameter matrix with the local matrix for proper effect.

MGraphic Attribute Bundles

As seen in FIG. 5, all MGraphic objects have an associated attribute bundle, TGrafBundle. This bundle holds the attribute information for the graphic object such as its color, pens, filled or framed. When an MGraphic is created, by default, the GrafBundle object is set to NIL. If GrafBundle is equal to a NIL, then the geometry is rendered by a default mechanism. When used in a hierarchy, the parent bundle must be concatenated with the child's bundle before rendering the child. If a child's bundle is NIL, then the child uses the parent's bundle for rendering. For example, in the hierarchy in FIG. 12, object E will inherit the attributes of both A, C and E before it is rendered, and a change of attribute in A will trickle down to all its children namely B, C D, E, G and D.

It is important to note that a bundle has a significant amount of information associated with it. Thus, copying of the bundle is generally avoided. Once the bundle is adopted, MGraphic object will take full responsibility to properly destroy the bundle when the MGraphic object is destroyed. When a client wishes to modify an attribute of an MGraphic object, they do so by orphaning the bundle, changing the attribute, and then having the MGraphic adopt the bundle. Also, all caches that depend upon bundles must be invalidated when the bundle is adopted or orphaned. When an object orphans data, it returns a pointer to the data and takes no further data management responsibility for the data. When an object adopts data, it takes in the pointer to the storage and assumes full responsibility for the storage. Default implementations of all bundle related member functions has been provided in the base MGraphic class and subclasses need not override this functionality, unless the subclasses have an attribute based cache which needs to be invalidated or updated whenever the bundle is adopted and orphaned. For example, the loose fit bounds, when cached, need to be invalidated (or reevaluated) when the attributes change.

Figure 11:
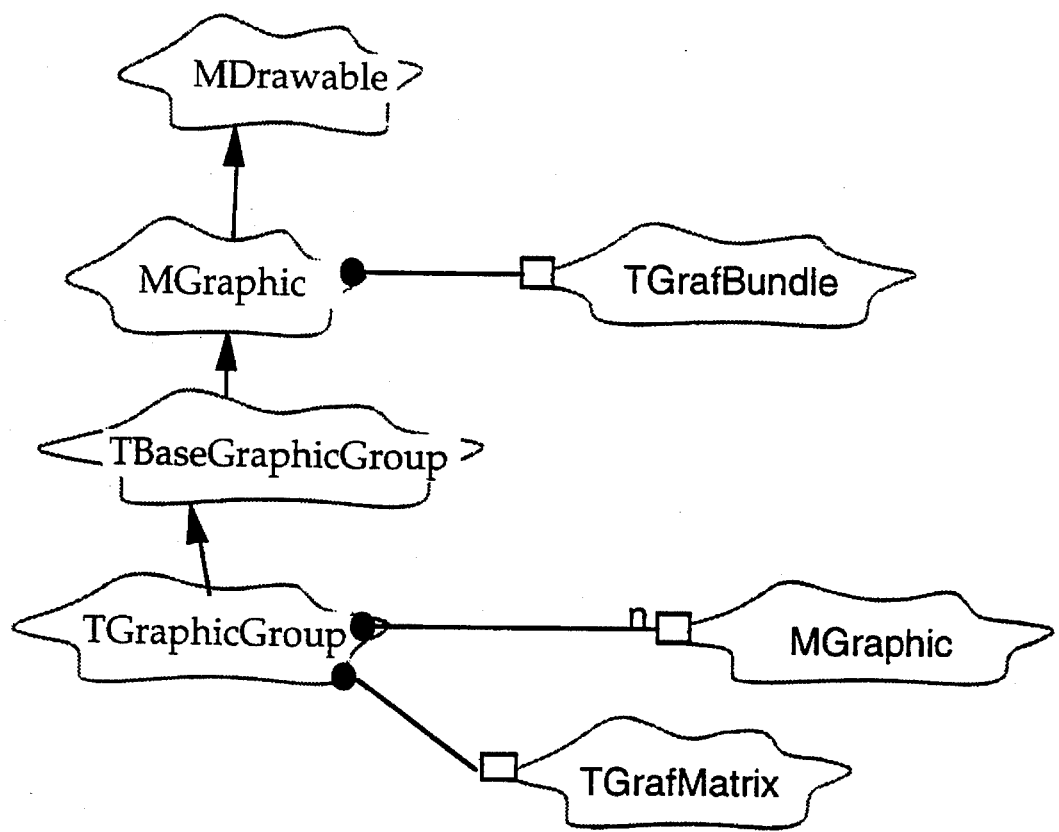
FIG. 11 illustrates a hierarchical graphic in accordance with a preferred embodiment.

C++ Application Program Interfaces (API) for Bundle Management virtual void AdoptBundle(TGrafBundle *bundle)
MGraphic adopts the bundle.
If an MGraphic object already holds a bundle, it is deleted, and the new bundle is attached. As pointers are passed, it is important for the clients not to keep references to the bundle passed as the parameter. The MGraphic object will delete the bundle when it gets destroyed.
virtual const TGrafBundle* GetBundle() const
This method allows users to inquire a bundle and then subsequently inquire its attributes by iterating through them. This method provides an alias to the bundle stored in the MGraphic object.
virtual TGrafBundle* OrphanBundle()
This method returns a bundle to a calling application for its use. Once this method is called, it is the calling application's responsibility to delete the bundle unless it is adopted again by an MGraphic object. When orphaned, the MGraphic bundle is set to NIL, and when the graphic is subsequently drawn, the MGraphic uses the default mechanism of attributes/bundles for its parent's bundle. This kind of MGraphic subclass references other MGraphic objects. Although all manipulative behavior of complex MGraphic objects is similar to a MGraphic object, these objects do not completely encapsulate MGraphic objects they refer to. Of the subclasses supported by a preferred embodiment, the one that falls in this category is TGraphicGroup. TGraphicGroup descends from the abstract base class TBaseGraphicGroup which makes available polymorphically the methods to create iterators for traversing groups. It is important for clients creating groups or hierarchies to descend from the base class TBaseGraphicGroup for making available the iterator polymorphically. FIG. 11 illustrates the class hierarchy in accordance with a preferred embodiment.

TBaseGraphicGroup Iterator Support

Since GraphicGroup facilitates creation of hierarchies, support for iterating the hierarchy is built into this base class and is available polymorphically. This method is virtual in the abstract base class TBaseGraphicGroup and all sub- classes provide an implementation. Subclasses which desire a shield for their children may return an empty iterator when this member function is invoked.
Protocol: TGraphicIterator* CreateGraphicIterator() const=0
This method creates a Graphic iterator which iterates through the first level of a hierarchy. For example in FIG. 12, the graphic iterator created a concrete subclass to iterate over B, C and F. To iterate further, iterators must be created for both B and C as these are TBaseGraphicGroups. All subclasses creating hierarchies must provide a concrete implementation.
TGraphicIterator is an active iterator that facilitates the iteration over the children of a TBaseGraphicGroup.
TGraphicIterator methods include:
const MGraphic *TGraphicIterator::First()
const MGraphic *TGraphicIterator::Next()
const MGraphic *TGraphicIterator::Last()

TGraphicGroup

Figure 12:
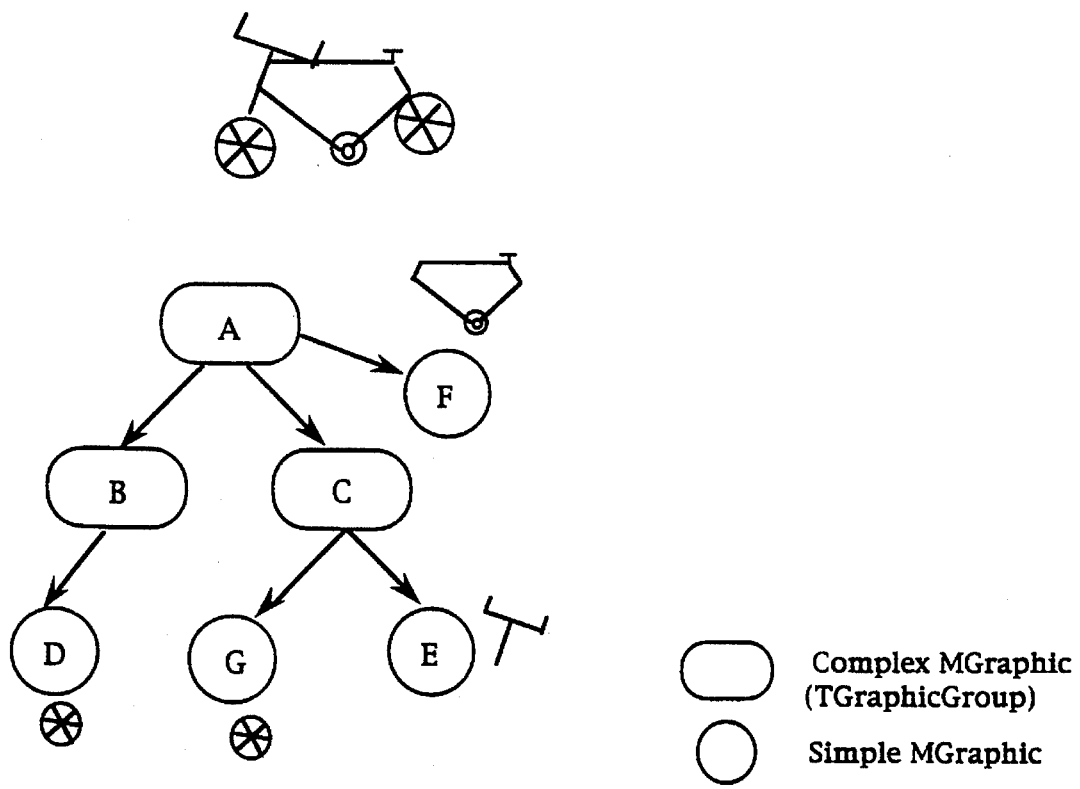
FIG. 12 illustrates a bike graphic in accordance with a preferred embodiment.

The graphic system provides a concrete subclass of TBaseGraphicGroup, namely TGraphicGroup, which supports creation of trees. TGraphicGroup creates a collection of MGraphic objects forming a group. As each of the MGraphic objects can be a TGraphicGroup, clients can create a hierarchy of objects. FIG. 12 is an example of a hierarchy created by TGraphicGroup. FIG. 12 contains TGraphicGroups A, B and C. D, E, F and G are different simple MGraphics encapsulating more than one geometry. A has references to B, C and F. B refers to D while C refers to G. Group C also refers to the MGraphic E. FIG. 12 can be considered as an over simplified bike, where A refers to MGraphic F-the body of bike, and groups B and C which refer to the transformations associated with the rear and the front wheel respectively. The two wheels are represented by the primitive geometries D and G. E represents the handle-bar of the bike. Moving node C will move both the front wheel and the handle-bar, and moving node A will move the entire bike.

While applying a transformation matrix to the children at the time of rendering, the group creates a temporary GrafPort object and concatenates its matrix with that stored in the GrafPort. This new GrafPort is used to render its children and is destroyed once the child is completely rendered. The GrafPort objects are created on the stack. TGraphicGroup does not allow its children to have more than one parent in a team. TGraphicGroup inherits directly from MGraphic and thus each of the nodes own its own grafbundle and can affect its own side of the hierarchy. The destructor of TGraphicGroup destroys itself and does not destroy its children. It is up to an application to keep track of references and destroy MGraphic objects when they are not referenced.

GraphicGroup Iterator

Graphic Group provides a concrete implementation for iterating its children. The Graphic Iterator created iterates only one level. Clients interested in iterating more than one level deep can do so by creating iterators on subsequent TGraphicGroups.

Attribute and Transformation Hierarchy

Each TGraphicGroup, if it so chooses, defines its own attributes and transformation. By default, an attribute bundle is NIL and the transformation matrix is set to the identity matrix. As TGraphicGroup is a complex MGraphic, it has references to other MGraphics, and its children. By definition, each of the children must inherit the attribute traits and transformations of its parent. However, since each child can contain multiple references, it inherits these attributes by concatenating the parents information, without modifying its own, at the time of rendering. The concatenation of these attributes is achieved at the time of the Draw call. Both the attribute and the matrix are concatenated with the TGrafPort object which is passed as a parameter to the Draw call. In FIG. 12, attributes and transformations of object A (body of bike) are concatenated with the GrafPort object passed to A (as parameter to member function Draw) and a new GrafPort object, APortObject, is created on the stack. APortObject is passed to object C which concatenates its state and creates a new port object, CPortObject. The new CPortObject is passed to object E to be rendered. Object E concatenates its state with CPortObject and renders itself using the new state.

MGRAPHIC EXAMPLE

Figure 13:
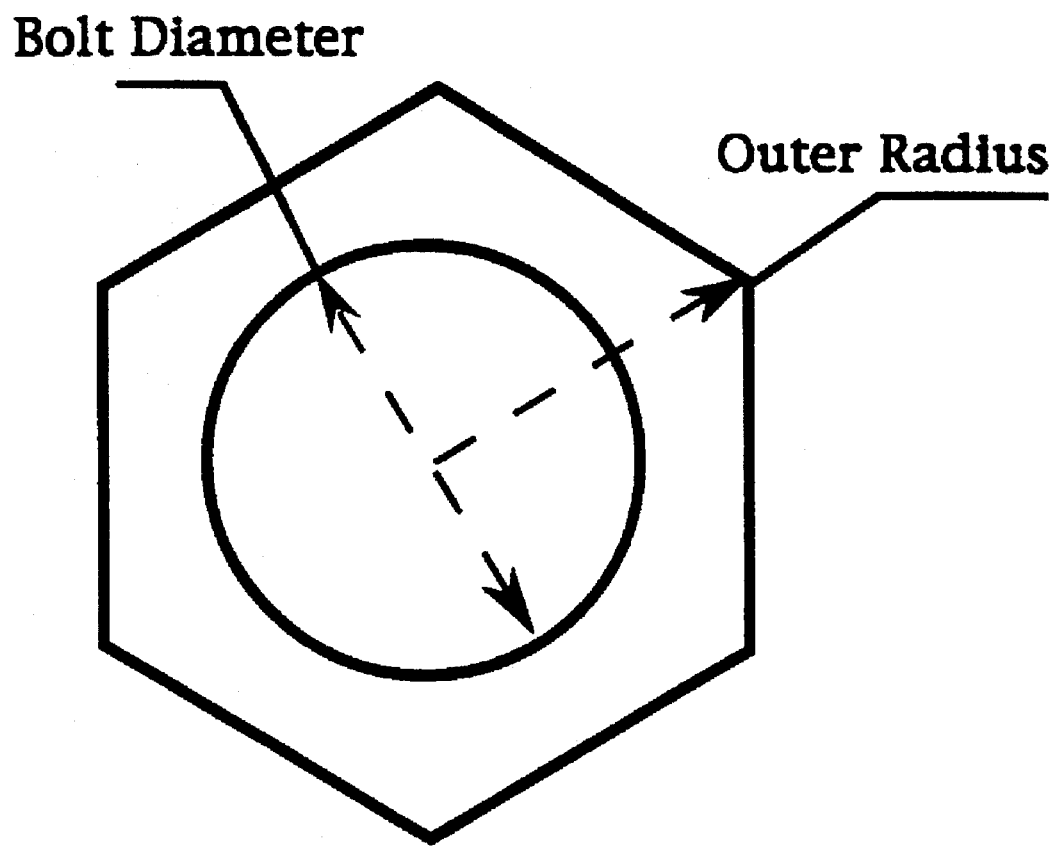
FIG. 13 illustrates a bolt object in accordance with a preferred embodiment.

As an example, a graphic is subclassed from MGraphic to create a special 2D primitive which corresponds to a top view of a bolt. This class stores a transformation matrix for a local coordinate system, and is a very simple example without taking into account performance and efficiency. FIG. 13 illustrates a bolt object in accordance with a preferred embodiment. The code below is a C++ source listing that completely defines the bolt object in accordance with a preferred embodiment.

```
class TBoltTop : public MGraphic {
public:
        TBoltTop(GCoord BoltDiameter, GCoord outerradius, TGPoint center);
        TBoltTop(const TBoltTop&);
        TBoltTop& operator= (const TBoltTop&);
        virtual void Draw(TGrafPort&) const;
        virtual TGPoint GetAlignmentBasePoint() const;
        virtual TGRect GetLooseFitBounds() const;
        virtual TGRect GetGeometricBounds() const;
        virtual void TransformBy(const TGrafmatrix& matrix);
        virtual Boolean Find(TGrafSearcher& searcher) const;
private:
        TBoltTop();              //For streaming purposes only.
        TGrafMatrix fMatrix;
        TGPolygon fPolygon;      // This is the outer polygon
        TGEllipse fCircle;       // This is the inner circle
        void ComputePolygon(GCoord outerRad, int numOfSides);
};
TBoltTop::TBoltTop()
{
}
TBoltTop::TBoltTop(GCoord boltDia, GCoord outerDia, TGPoint center)
                                                        : fCircle(boltDia, center)
{
        calculate the hexagon polygon from these paramters
        The side of the polygon = outerDiameter / 2.0
        TGPointArray polygonPoints(6);
        TGPoint tmpPoint;
        for (unsigned long i = 0, theta = 0.0;i < 6;i ++,
                                                        theta += kPi/6) {
                tmpPoint.fX = center.fX + outerDia * sin(theta);
                tmpPoint.fY = center.fY + outerDia * cos(theta);
                polygonPoints.SetPoint(i, tmpPoint);
        }
}
void TBoltTop::Draw(TGrafPort &port) const
{
        /*
        * draw the geometry with the GrafIlundle and the matris
        * associated with this primitive
        */
        port.Draw(fPolygon, fGrafBundle, fMatrix);
        port.Draw(fCircle, fGrafBundle, fMatrix);
        /*
        * If there are a large number of primitives with same attributes
        * it is efficient to construct a local port and then render
        * geometries into this local port.
        * The semantics will be as:
        *
        * TConcatenatedGrafPort newPort(port, fGrafBundle, fMatrix);
        * TConcatenatedGrafPort is a port that concatenates bundle and
        * matrix with the state information of the old port.
        *
        * newPort.Draw(fPolygon);
        * newPort.Draw(fCircle);
        */
}
TGPoint TBoltTop::GetAlignmentBasePoint() const
{
        // The alignment point is the center of the circle.
```

```
        TGPoint point;
            point.x = fCircle.GetCenterX();
            point.y = fCircle.GetCenterY();
            return point;
}
TGRect TBoltTop::GetLooseFitBounds() const
{
        TGRect bounds;
        // Get bounds of the polygon
        // pass the bounds to the bundle for altering.
        GetGeometricBounds(bounds);
        fGrafBundle->AlterBounds(bounds);
        return bounds;
}
TGRect TBoltTop::GetGeometricBounds() const
{
        // Get bounds of the polygon
        // pass the bounds to the bundle for altering.
        bounds = fPolygon.GetBounds();
}
void TBoltTop::TransformBy(const TGrafMatrix& matrix)
{
        fMatrix.ConcatWith(matrix);
}
void TGrafSearch::EFindResult TBoltTop::Find(TGrafSearch& search) const
{
        if (!search.find(fPolygon, fgrafBundle, fMatrix)) {
                return search.find(fCircle, fGrafBundle, fMatrix);
        }
        return TGrafSearch::kDoneSearching;
}
```

The Device Cache

The device cache can potentially be a large object, so care must be taken to ensure that device caches do not proliferate throughout the system unexpectedly. If the same base, GrafPort, is utilized for a number of hierarchies, the hierarchies would automatically share the cache in the base GrafPort.

Graphic State Concatenation

Figure 14:
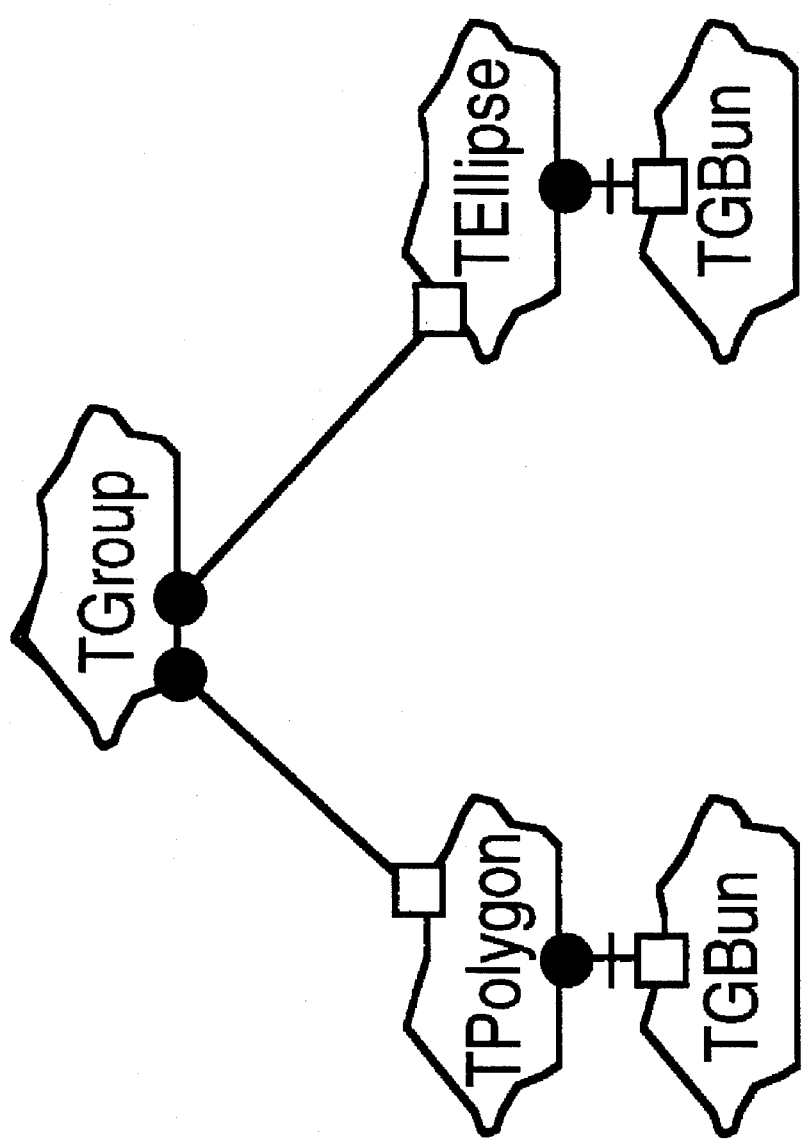
FIG. 14 illustrates a hierarchical graphic in accordance with a preferred embodiment.

FIG. 14 illustrates a hierarchical graphic in accordance with a preferred embodiment. The graphic consists of a polygon and an ellipse in a group. Each graphic in the hierarchy can store a graphic state. For instance, the polygon and the ellipse each have a TGrafBundle, while the TGroup stores no graphic state. This architecture is easily understood until hierarchical states for matrices are considered. To produce the correct geometry matrix, a graphic's local view matrix must be concatenated with the view matrix of its parent. This concatenated matrix may then be cached by the graphic that provided it. A graphic's state must be "concatenated" to that of its parent graphic, producing a new, full set of states that applies to the graphic. When TGroup::Draw is called, its parent's graphic port object is passed in. Since the TGroup has no state of its own, it doesn't perform any concatenation. It simply passes its parent's graphic port object to the polygon's Draw call and then to the ellipse's Draw call.

Figure 15:
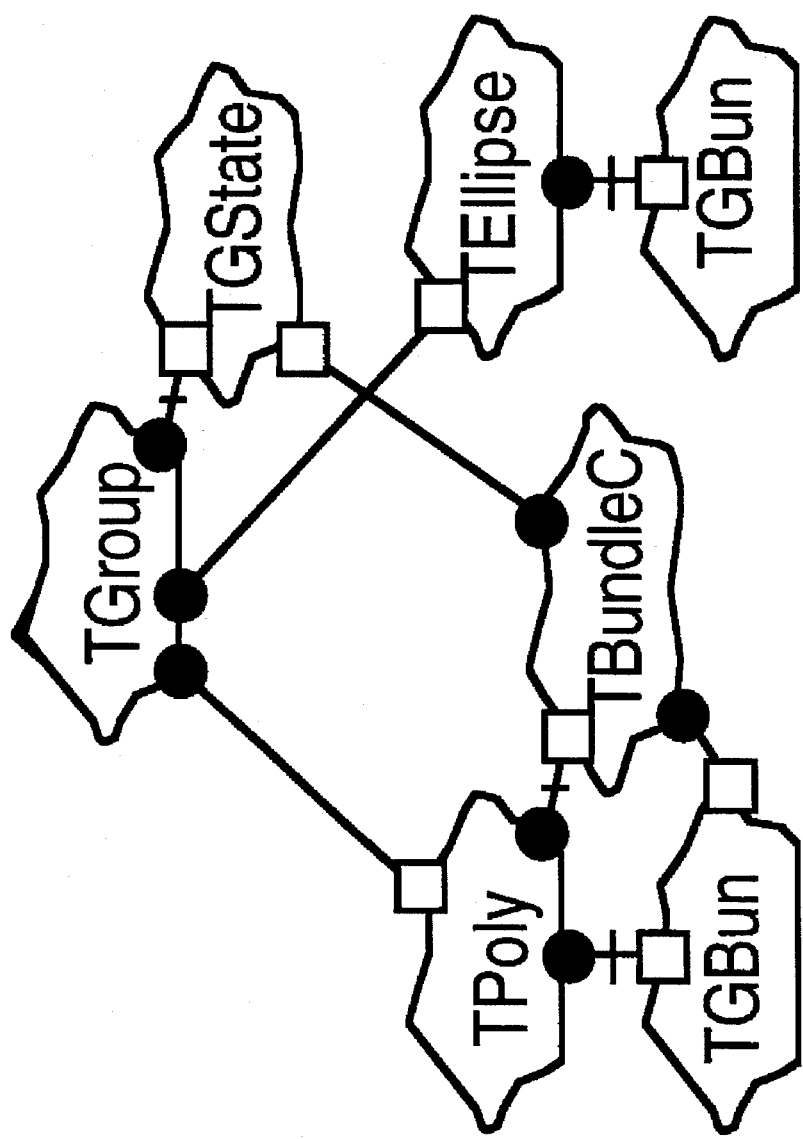
FIG. 15 illustrates an object that exists inside the TPolygon's Draw call in accordance with a preferred embodiment.
Figure 16:
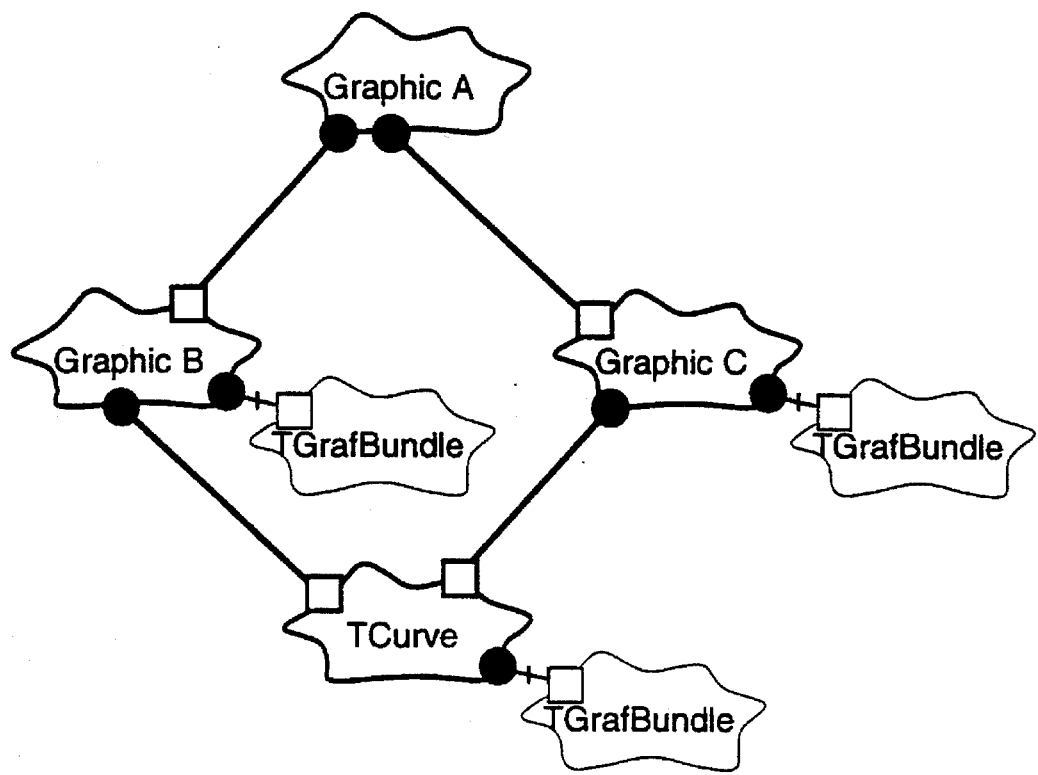
FIG. 16 illustrates a graphic hierarchy that supports sharing of two or more graphics in accordance with a preferred embodiment.

The polygon has a TGrafBundle object that must be concatenated to its parent's graphic port object. This is facilitated by creating a local graphic port subclass that can perform this concatenation. It then makes a call to TBundleConcatenator::Draw. FIG. 15 illustrates an object that exists inside the TPolygon's Draw call in accordance with a preferred embodiment. Because the TBundleConcatenator object is created locally to a TPolygon's Draw call, this type of concatenation is transient in nature. This processing is required for particular types of graphic hierarchies. For instance, a graphic hierarchy that allows a particular graphic to be shared by two or more other graphics must implement transient concatenation because the shared graphic has multiple parents. FIG. 16 illustrates a graphic hierarchy that supports sharing of two or more graphics in accordance with a preferred embodiment. The curve object in this example is shared by graphics B and C. Thus, the concatenation must be transient because the results of the concatenation will be different depending on the branch taken (B or C).

Graphic objects in a persistent hierarchy require knowledge of parental information, allowing a graphic to be drawn using its parent's state without drawing its parent. A graphic in the hierarchy cannot be shared by multiple parents. Extra semantics, such as a ConcatenateWithParent call and a Draw call with no parameters, must be added to the graphic classes used in the hierarchy. A graphic may use a graphic port subclass that stores more state, such as a coordinate system and clip boundary. Thus, each graphic may also want to keep its own private device cache.

Figure 17:
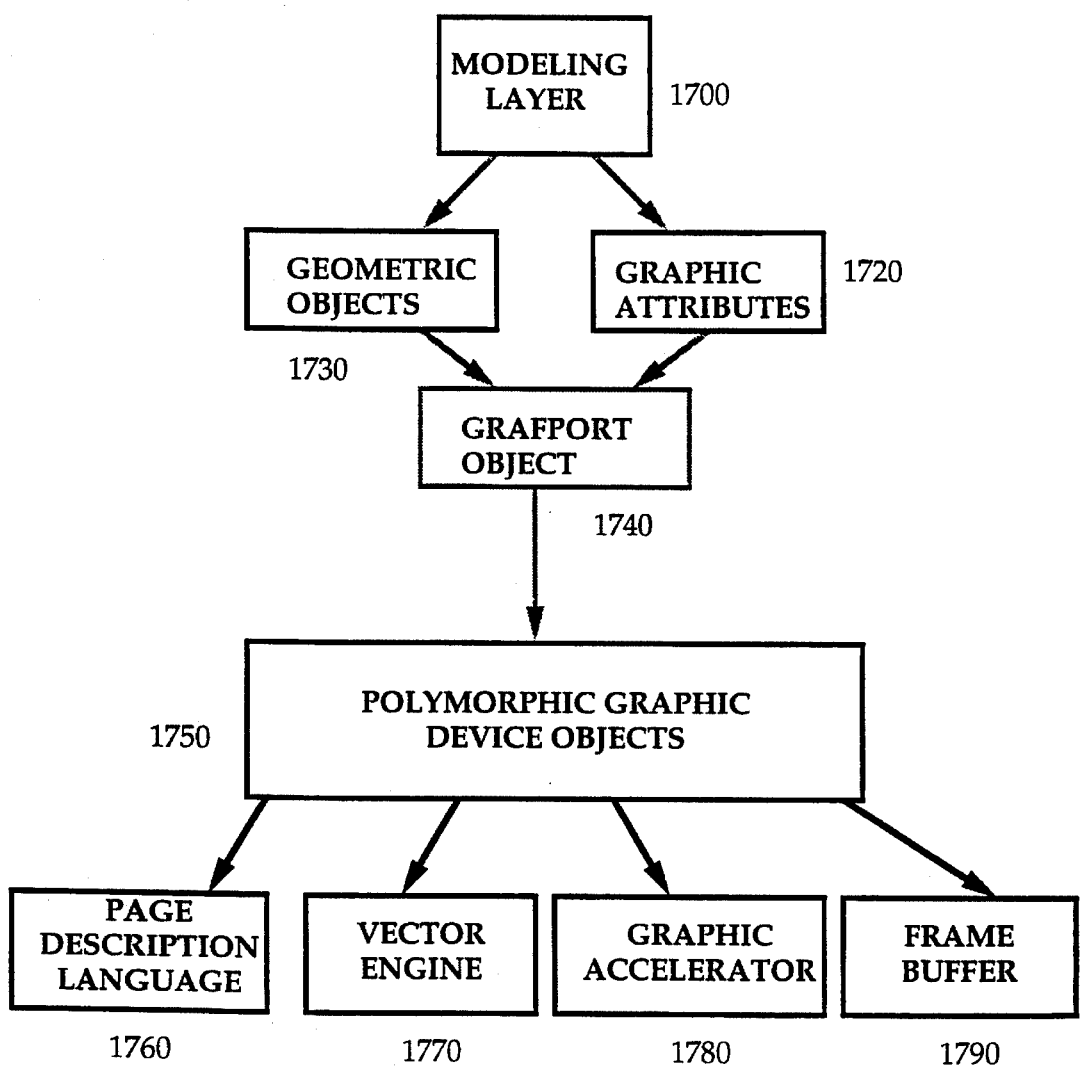
FIG. 17 is a flowchart setting forth the detailed logic in accordance with a preferred embodiment.

FIG. 17 is a flowchart of the detailed logic in accordance with a preferred embodiment. Processing commences at function block 1700 where a modeling layer object communicates with the grafport object 1740 with a fixed set of geometric objects 1730 and an extensible set of graphic attribute objects 1720. The grafport object 1740 passes the geometric object 1730 and graphic attributes 1720 to a polymorphic graphic device object 1750 which manages devices (hardware and software) such as a page description language object 1760, a vector engine object 1770, a graphic accelerator object 1780, a frame buffer object 1790; or more traditional graphic devices such as displays, printers or plotters as depicted in FIG. 1.

While the invention has been described in terms of a single preferred embodiment, those skilled in the art will recognize that the invention can be practiced with modification within the spirit and scope of the appended claims.

Having thus described our invention, what we claim as new, and desire to secure by Letters Patent is:

1. An object-oriented graphic system, comprising:
   (a) a processor;
   (b) a storage under the control of and attached to the processor;
   (c) one or more graphic devices under the control of and attached to the processor;
   (d) a grafport object in the storage of the processor;
   (e) a graphic device object in the storage of the processor for managing one of the one or more graphic devices;
   (f) a graphic object in the storage of the processor for managing graphic processing; and
   (g) means for connecting the graphic device object to the grafport object to output graphic information on the one of the one or more graphic devices under the control of the graphic object.

2. A system as recited in claim 1, including a graphic accelerator graphic device object.

3. A system as recited in claim 1, including a frame buffer graphic device object.

4. A system as recited in claim 1, including a page description language graphic device object.

5. A system as recited in claim 1, including a vector engine graphic device object.

6. A system as recited in claim 1, wherein the grafport object, the graphic device object and the graphic object are polymorphic.

7. A system as recited in claim 1, wherein the grafport object, the graphic device object and the graphic object are fully extensible.

8. A system as recited in claim 1, including a modeling layer in the graphic object.

9. A system as recited in claim 8, including a geometric object and a graphic attribute object in the modeling layer.

10. A system as recited in claim 1, wherein the geometric object includes geometry for the graphic information.

11. A system as recited in claim 1, wherein the graphic device objects include displays, printers and plotters.

12. A method for graphic processing in an object-oriented operating system resident on a computer with a processor, a storage attached to and under the control of the processor and a graphic device attached to and under the control of the processor, comprising the steps of:
   (a) building a modeling layer object in the storage;
   (b) generating calls from the modeling layer object to grafport object using a predefined set of graphic primitives;
   (c) capturing state information and rendering information at the grafport object; and
   (d) passing the state information and the rendering information to a graphic device object for output on the graphic device.

13. The method as recited in claim 12, including state information with transform, appearance and clipping information.

14. The method as recited in claim 12, wherein the graphic device is a software or a hardware graphic processor.

15. An apparatus for graphic processing, comprising:
   (a) a processor,
   (b) a storage attached to and under the control of the processor;
   (c) a graphic device attached to and under the control of the processor;
   (d) a modeling layer object in the storage;
   (e) a grafport object in the storage;
   (f) means for generating calls from the modeling layer object to the grafport object using a predefined set of graphic primitives;
   (g) means for capturing state information and rendering information at the grafport object; and
   (h) means for passing the state information and the rendering information to a graphic device object for output on the graphic device.

16. The apparatus as recited in claim 15, wherein the state information includes transform, appearance and clipping information.

17. The apparatus as recited in claim 15, wherein the graphic device is a vector engine.

18. The apparatus as recited in claim 15, wherein the graphic device is a graphic accelerator.

19. The apparatus as recited in claim 15, wherein the graphic device is a frame buffer.

20. The apparatus as recited in claim 15, wherein the graphic device is a plotter.

21. The apparatus as recited in claim 15, wherein the graphic device is a printer.

22. The apparatus as recited in claim 15, wherein the graphic device is a display.

23. The apparatus as recited in claim 15, wherein the graphic device is a postscript processor.

24. The apparatus as recited in claim 15, wherein the modeling layer object includes at least one geometric object and at least one graphic attribute object.

25. The apparatus as recited in claim 15, wherein an object includes a method and data.

26. The apparatus as recited in claim 25, wherein the object is polymorphic and extensible.

* * * * *